United States Patent [19]

Sasaki et al.

[11] Patent Number: 4,743,665

[45] Date of Patent: May 10, 1988

[54] PROCESS FOR PRODUCING α-OLEFIN POLYMERS

[75] Inventors: Toshio Sasaki; Masaaki Katao, both of Ichihara; Kiyoshi Kawai, Chiba; Akinobu Shiga, Ichihara, all of Japan

[73] Assignee: Sumitomo Chemical Company, Limited, Osaka, Japan

[21] Appl. No.: 1,857

[22] Filed: Jan. 9, 1987

Related U.S. Application Data

[62] Division of Ser. No. 841,629, Mar. 20, 1986, Pat. No. 4,672,050.

[30] Foreign Application Priority Data

Mar. 25, 1985 [JP] Japan .................................. 60-59792
Jun. 14, 1985 [JP] Japan ................................ 60-130572

[51] Int. Cl.$^4$ .............................................. C08F 4/64
[52] U.S. Cl. .................................... 526/119; 526/348; 526/351
[58] Field of Search ............... 526/119, 128, 142, 348, 526/351

[56] References Cited

U.S. PATENT DOCUMENTS

| 4,210,738 | 7/1980 | Hermans et al. | 526/119 X |
| 4,297,463 | 10/1981 | Ueno et al. | 526/351 X |
| 4,335,016 | 6/1982 | Dombro | 526/128 |
| 4,339,560 | 7/1982 | Baba et al. | 526/142 |
| 4,497,906 | 2/1985 | Hanji et al. | 526/128 X |
| 4,533,706 | 8/1985 | Shiga et al. | 526/119 |
| 4,550,094 | 10/1985 | Hanji et al. | 526/128 X |
| 4,556,648 | 12/1985 | Kawai et al. | 526/128 X |

FOREIGN PATENT DOCUMENTS

| 0026027 | 4/1981 | European Pat. Off. |
| 0111902 | 6/1984 | European Pat. Off. |
| 2265768 | 10/1975 | France. |
| 1498862 | 1/1978 | United Kingdom. |
| 2167762 | 6/1986 | United Kingdom. |

Primary Examiner—Patrick P. Garvin
Attorney, Agent, or Firm—Stevens, Davis, Miller & Mosher

[57] ABSTRACT

A catalyst comprising:

(A) a solid catalyst component containing a tri-valent titanium compound, which is obtained by reducing a titanium compound represented by the general formula $Ti(OR^1)_nX_{4-n}$ (wherein $R^1$ is a hydrocarbon group having 1 to 20 carbon atoms, X is a halogen atom and n is a number satisfying $0 < n \leq 4$) with an organo magnesium compound in the presence of an organo silicon compound having Si-O bonds and then treating the resulting solid product with an ester compound and a mixture of an ether compound and titanium tetrachloride, (B) an organo aluminum compound, and (C) a silicon compound having Si—$OR^2$ bonds (wherein $R^2$ is a hydrocarbon group having 1 to 20 carbon atoms) and/or an organic carboxylic acid ester, and a process for producing α-olefin polymers using the same.

1 Claim, No Drawings

PROCESS FOR PRODUCING α-OLEFIN POLYMERS

This is a division of application Ser. No. 84,629, filed Mar. 20, 1986, and now U.S. Pat. No. 4,672,050.

BACKGROUND OF THE INVENTION

1. Field of the Invention

This invention relates to a solid catalyst component, a catalyst system and a process for producing α-olefin polymers using the catalyst system. More particularly, the invention relates to a novel solid catalyst component and catalyst system having a very high catalyst activity. This catalyst system can be used for the production of α-olefin polymers having a very low catalyst residue content and excellent in mechanical properties and workability.

2. Description of the Prior Art

It is generally known that a so-called Ziegler-Natta catalyst consisting of a compound of a transition metal of the groups IV to VI of the periodic table and an organo metal compound of a metal of the groups I to III of the periodic table is used for the production of polymers of α-olefins such as propylene, butene-1 and the like.

Particularly, a titanium chloride catalyst is used widely in the industrial production of α-olefin polymers.

In the above production, however, amorphous polymers are formed as a by-product besides α-olefin polymers of high stereoregularity and accordingly of high industrial value.

These amorphous polymers have a low industrial value and adversely affect the mechanical properties of α-olefin polymers when the α-olefin polymers are worked and used as a film, a fiber, etc.

Further, formation of amorphous polymers incurs the loss of raw material monomers and makes it requisite to instal a facility for removal of such amorphous polymers, causing very large industrial disadvantages.

Therefore, if no or substantially no amorphous polymer is formed, it can be become a very large industrial advantage.

The α-olefin polymers obtained in the above polymerization contain a catalyst residue. This catalyst residue reduces the various properties of α-olefin polymers such as stability, workability and the like. Therefore, there is required a facility for removal of catalyst residue and for stabilization of α-olefin polymers.

The above problem (reduction in some properties of α-olefin polymers) can be improved by the increase of catalyst activity represented by the weight of α-olefin polymer produced per the unit weight of catalyst. This increase of catalyst activity also brings about no necessity of facility for catalyst residue removal as well as the lowering of production cost of α-olefin polymers.

There are various processes for production of titanium trichloride, such as (1) a process wherein titanium tetrachloride is reduced with hydrogen and then ground in a ball mill for activation, (2) a process wherein titanium tetrachloride is reduced with metallic aluminum and then ground in a ball mill for activation and (3) a process wherein titanium tetrachloride is reduced with an organo aluminum compound at a temperature at −30° to 30° C. and the resulting reduced solid product is heat-treated at a temperature of 120° to 180° C.

Titanium trichloride produced from any of the above processes is not fully satisfactory in any of catalyst activity and stereoregularity.

In polymerization of α-olefins using a catalyst system consisting of (1) a solid catalyst component obtained by, for example, (a) a process wherein titanium tetrachloride is reduced with an organo aluminum compound and the resulting reduced solid is treated with a complexing agent and reacted with titanum tetrachloride (U.S. Pat. No. 4,210,738) or (b) a process wherein a titanium compound represented by the general formula $Ti(OR)_nX_{4-n}$ is reduced with an organo aluminum compound and then treated with a mixture of an ether compound and titanium tetrachloride (U.S. Pat. No. 4,533,706) and (2) an organo aluminum compound, the stereoregularity of α-olefin polymers obtained is high but the catalyst activity is not satisfactory.

It is also known that titanium trichloride can be produced by reducing titanium tetrachloride with an organo magnesium compound such as a Grignard reagent.

Concerning the above, there is a process of reducing titanium tetrachloride with an organo magnesium compound and then treating the resulting solid product with a Lewis acid (British Pat. No. 1498862).

With the catalysts obtained from these processes, however, the catalyst activity is high but the stereoregularity of α-olefin polymers produced is not satisfactory.

SUMMARY OF THE INVENTION

The object of the present invention is to provide a solid catalyst component, a catalyst system and a process for producing α-olefin polymers using the catalyst system. The catalyst system has such a catalyst activity as makes the removal of catalyst residue and amorphous polymer unnecessary and allows the produced α-olefin polymers to have satisfactory stereoregularity.

According to the present invention there is provided a catalyst system for α-olefin polymerization comprising:

(A) a solid catalyst component containing a tri-valent titanium compound, which is obtained by reducing a titanium compound represented by the general formula $Ti(OR^1)_nX_{4-n}$ (wherein $R^1$ is a hydrocarbon group having 1 to 20 carbon atoms, X is a halogen atom and n is a number satisfying $0 < n \leq 4$) with an organo magnesium compound in the presence of an organo silicon compound having Si—O bonds and then treating the resulting solid product with an ester compound and a mixture of an either compound and titanium tetrachloride, (B) an organo aluminum compound, and (C) a silicon compound having Si—$OR^2$ bonds (wherein $R^2$ is a hydrocarbon group having 1 to 20 carbon atoms) and/or an organic carboxylic acid ester.

By use of this catalyst system, the above mentioned object of the present invention can be achieved.

DETAILED DESCRIPTION OF THE INVENTION

The present invention will be explained specifically below.

(a) Titanium compound

The titanium compound used in the present invention is represented by the general formula $Ti(OR^1)_nX_{4-n}$ (wherein $R^1$ is a hydrocarbon group of 1 to 20 carbon atoms; X is a halogen atom; and n is a number satisfying $0 < n \leq 4$). Specific examples of $R^1$ include alkyl groups such as methyl, ethyl, n-propyl, isopropyl, n-butyl, isobutyl, n-amyl, isoamyl, n-hexyl, n-heptyl, n-octyl, n-decyl, n-dodecyl and the like; aryl groups such as phenyl, cresyl, xylyl, naphthyl and the like; cycloalkyl groups such as cyclohexyl, cyclopentyl and the like; alkenyl groups such as propenyl and the like; and aralkyl groups such as benzyl and the like.

As the $R^1$, an alkyl group of 2 to 18 carbon atoms or an aryl group of 6 to 18 carbon atoms is preferred. A straight chain alkyl group of 2 to 18 carbon atoms is particularly preferred.

It is possible to use a titanium compound having two or more different $-OR^1$ groups.

As the halogen atom represented by X, there can be used chlorine, bromine, iodine or the like. Of these, chlorine gives a most desirable result.

The n of the general formula $Ti(OR^1)_n X_{4-n}$ is a number satisfying $0 < n \leq 4$, preferably $2 \leq n \leq 4$, more preferably 4.

The titanium compound represented by the general formula $Ti(OR^1)_n X_{4-n}$ ($0 < n \leq 4$) can be produced in accordance with known synthesis processes. For example, it can be produced in accordance with a process of reacting $Ti(OR^1)_4$ and $TiX_4$ in a given proportion or with a process of reacting $TiX_4$ with a corresponding alcohol in a given proportion.

(b) Organo silicon compound having Si-O bonds

The organo silicon compound having Si-O bonds, used in the synthesis of the component (A) of the present catalyst system is represented by the following general formula.

$$Si(OR^3)_m R^4_{4-m},$$

$$R^5(R^6 SiO)_p SiR^7_3 \text{ or}$$

$$(R^8_2 SiO)_q$$

(wherein $R^3$ is a hydrocarbon group having 1 to 20 carbon atoms; $R^4$, $R^5$, $R^6$, $R^7$ and $R_8$ are each a hydrocarbon group having 1 to 20 carbon atoms or a hydrogen atom; m is a number satisfying $0 < m \leq 4$; p is an integer of 1 to 1,000; and q is an integer of 2 to 1,000).

Specific examples of the organo silicon compound include the following compounds.

Tetramethoxysilane, dimethyldimethoxysilane, tetraethoxysilane, triethoxyethylsilane, diethoxyethylsilane, ethoxytriethylsilane, tetraisopropoxysilane, diisopropoxydiisopropylsilane, tetrapropoxysilane, diproposydipropylsilane, tetra-n-butoxysilane, di-n-btoxy-di-n-butylsilane, dicyclopentoxydiethylsilane, diethoxydiphenylsilane, cyclohexyloxytrimethylsilane, phenoxytrimethylsilane, tetraphenoxysilane, triethoxyphenylsilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, and phenylhydropolysiloxane.

Preferable of these are alkoxysilane compounds represented by the general formula $Si(OR^3)_m R^4_{4-m}$. M is preferred to be $1 \leq m \leq 4$. A tetraalkoxysilane compound (m=4) is particularly preferred.

(c) Organo magnesium compound

The organo magnesium compound used in the present invention can be any organo magnesium compound as long as it has at least one Mg—C bond. There is preferably used a Grignard compound represented by the general formula $R^9 MgX$ (wherein $R^9$ is a hydrocarbon group having 1 to 20 carbon atoms and X is a halogen atom), or a dialkylmagnesium compound or a diarylmagnesium compound both represented by the general formula $R^{10} R^{11} Mg$ (wherein $R^{10}$ and $R^{11}$ can be same or differnet and are each a hydrocarbon group having 1 to 20 carbon atoms). $R^9$, $R^{10}$ and $R^{11}$ are each an alkyl, aryl, aralkyl or alkenyl group such as methyl, ethyl, n-propyl, isopropyl, n-butyl, sec-butyl, tert-butyl, n-amyl, isoamyl, n-hexyl, n-octyl, 2-ethylhexyl, phenyl, benzyl or the like.

Specific examples of the Grignard compound include methylmagnesium chloride, ethylmagnesium chloride, ethylmagnesium bromide, ethylmagnesium iodie, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, isoamylmagnesium chloride, phenylmagnesium chloride and phenylmagnesium bromide. Specific examples of the compound represented by $R^{10} R^{11} Mg$ include diethylmagnesium, di-n-propylmagnesium, diisopropylmagnesium, di-n-butylmagnesium, di-sec-butylmagnesium, di-tert-butylmagnesium, n-butyl-sec-butylmagnesium, di-n-amylmagnesium and diphenylmagnesium.

As the synthesis solvent for the organo magnesium compound, there can be used an ether solvent such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetol, anisole, tetrahydrofuran, tetrahydropyran or the like. Alternatively, there can be used a hydrocarbon solvent such a hexane, heptane, octane, cyclohexane, methylcyclohexane, benzene, toluene, xylene or the like, or a mixed solvent of an ether solvent and a hydrocarbon solvent. The organo magnesium compound is used preferably in the form of ether solution. The ether in this case is an ether compound having at least 6 carbon atoms within the molecule or having a cyclic structure.

The use of a Grignard compound represented by $R^9 MgCl$ in the form of an ether solution is particularly preferred from the point of catalyst potency.

The organo magnesium compound can also be used in the form of a hydrocarbon-soluble complex between said compound and an organo metal compound capable of rendering the organo magnesium compound soluble in hydrocarbons. Examples of the organo metal compound includes organic compounds of Li, Be, B, Al or Zn.

(d) Ester compound

As the ester compound used for the syntheis of the catalyst component (A) in the present invention, there can be mentioned mono-or polycarboxylic acid esters namely, aliphatic carboxylic acid esters, olefinic carboxylic acid esters, alicyclic carboxylic acid esters and aromatic carboxylic acid esters. Specific examples of the ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate and diphenyl phthalate.

Preferable of these are olefinic carboxylic acid esters such as methacrylic acid esters, maleic acid esters and the like; aromatic carboxylic acid esters such as benzoic acid esters and the like; and phthalic acid esters.

(e) Ether compound

As the ether compound of the present invention, there are preferably used dialkyl ethers such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, ethyl isobutyl ether and the like.

Of these, di-n-butyl ether and diisoamyl ether are particularly preferable.

(f) Synthesis of the solid catalyst component (A)

The solid catalyst component (A) of the present invention can be synthesized by reducing a titanium compound with an organo magnesium compound in the presence of an organo silicon compound and then treating the resulting solid product with an ester compound and a mixture of an ether compound titanium tetrachloride. Preferably, the treatment of the solid product is conducted firstly with an ester compound and secondly with a mixture of an ether compound and titanium tetrachloride.

All the steps of the synthesis reaction are conducted in an inert gas atmosphere such as nitrogen, argon or the like.

In the reduction of the titanium compound with the organo magnesium compound, the organo magnesium compound is added to a mixture of the titanium compound and the organo silicon compound. Alternatively, said mixture of the titanium compound and the organo silicon compound may be added to a solution of the organo magnesium compound. In view of the catalyst activity, a process comprising adding an organo magnesium compound to a mixture of a titanium compound and an organo silicon compound is preferred.

Preferably, the titanium compound and the organo silicon compound are used after having been dissolved in or diluted by an appropriate solvent.

As such a solvent, there can be mentioned aliphatic hydrocarbons such as hexane, heptane, octane, decane and the like; aromatic hydrocarbons such as toluene, xylene, decalin and the like; alicyclic hydrocarbons such as cyclohexane, methylcyclohexane and the like; and ether compounds such as diethyl ether, dibutyl ether, d-isoamyl ether, tetrahydrofuran and the like.

The reduction temperature is generally −50° to 70° C., preferably −30° to 50° C., and particulary preferably −25° to 35° C. If the reduction temperature is excessively high, the catalyst activity lowers.

The dropping has no particular restriction but ordinarily is 30 minutes to about 6 hours. After the completion of the reduction, a post-reaction may be conducted at a temperature of 20° to 120° C.

The amount of the organo silicon compound used is 1 to 50, preferably 3 to 30, particulary preferably 5 to 25 in terms of Si/Ti, namely, the atomic ratio of silicon atom to titanium atom in titanium compound.

The amount of the organo magnesium compound used is 0.1 to 10, preferably 0.2 to 5.0, particularly preferably 0.5 to 2.0 in terms of (Ti+Si)/Mg, namely, the atomic ratio of the sum of titanium atom and silicon atom to magnesium atom.

The solid product obtained by the reduction is subjected to solid-liquid separation and then washed several times with an inert hydrocarbon solvent such as hexane, heptane or the like.

The solid product thus obtained contains trivalent titanium, magnesium and hydrocarbyloxy group and is generally amorphous or very slightly crystalline. Preferably, it has an amorphous structure from the point of catalyst potency.

The solid product is then treated with the ester compound.

The amount of the ester compound used is 0.1 to 50 moles, preferably 0.3 to 20 moles, particularly preferably 0.5 to 10 moles per 1 mole of titanium atom in the solid product.

Or, the amount of the ester compound used is 0.01 to 1.0 mole, preferably 0.03 to 0.5 mole per 1 mole of magnesium atom in the solid product. Use of an excessive amount of the ester compound causes the disentegration of solid product particles.

The treatment of the solid product with the ester compound can be conducted with any known method wherein they are contacted with each other, such as a slurrying method, a mechanical grinding method (e.g. a ball mill method) or the like. Mechanical grinding generates a large amount of a fine powder in a solid catalyst component produced, whereby the particle size distribution of the solid catalyst component is widened. Therefore, the mechanical grinding is undesirable from an industrial standpoint. Contact of the solid product and the ester compound is preferably conducted in the presence of a diluent.

As the diluent, there can be used aliphatic hydrocarbons such as pentane, hexane, heptane, octane and the like; aromatic hydrocarbons such as benzene, toluene, xylene and the like; alicyclic hydrocarbons such as cyclohexane, cyclopentane and the like; and halogenated hydrocarbons such as 1,2-dichloroethane, monochlorobenzene and the like. Halogenated hydrocarbons are particularly preferable.

The amount of the diluent used is 0.1 to 1,000 ml, preferably 1 to 100 ml per 1 g of solid product. The treatment temperature is −50° to 150° C., preferably 0° to 120° C. The treatment time is 10 minutes or longer, preferably 30 minutes to 3 hours. After the completion of the treatment, the resulting mixture is allowed to stand and then is subjected to solid-liquid separation. The resulting solid is washed several times with an inert hydrocarbon solvent to obtain an ester-treated solid.

The above treatment of the solid product with the ester compound can alternatively be conducted by allowing the ester compound to co-exist in the following treatment of the ester-treated solid with a mixture of the ether compound and titanium tetrachloride.

The treatment of the ester-treated solid with a mixture of the ether compound and titanium tetrachloride is preferably conducted in a slurry state. The solvent used for slurrying includes aliphatic hydrocarbons such as pentane, hexane, heptane, octane, decane and the like; aromatic hydrocarbons such as toluene, xylene, decalin and the like; alicyclic hydrocarbons such as cyclohexane, methylcyclohexane and the like; and halogenated hydrocarbons such as dichlorethane, trichloroethane, trichloroethylene, monochlorobenzene, dichlorobenzene, trichlorobezene and the like. Of these, halogented hydrocarbons are particularly preferable.

The slurry concentration is preferably 0.05 to 0.5 g solid/ml solvent, particularly preferably 0.1 to 0.3 g solid/ml solvent.

The reaction temperature is 30° to 150° C., preferably 45° to 120° C., particularly preferably 60° to 100° C.

The reaction time has no particular restriction but ordinarily is 30 minutes to 6 hours.

With respect to the addition order of the ester-treated solid, the ether compound and tianium tetrachloride can be added to the ester-treated solid, or, the ester-treated solid can be added to a solution containing both the ether compound and titanium tetrachloride.

When the ether compound and titanium tetrachloride are added to the ester-treated solid, it is preferable that the ether compound and titanium tetrachloride be added separately in this order or simultaneously.

The reaction of the ester-treated solid with a mixture of the ether compound and titanium tetrachloride can be conducted two times or more. Conducting the reaction at least two times is preferable from the standpoint of catalyst activity and stereoregularity.

The amount of the ether compound used is 0.1 to 100 moles, preferably 0.5 to 50 moles, particularly preferably 1 to 20 moles per 1 mole of titanium atom in solid product.

The amount of titanium tetrachloride added is 1 to 1,000 moles, preferably 3 to 500 moles, particularly preferably 10 to 300 moles per 1 mole of titanium atom in solid product. The amount of titanium tetrachloride added is also 1 to 100 moles, preferably 1.5 to 75 moles, particularly preferably 2 to 50 moles per 1 mole of ether compound.

The thus obtained solid catalyst component containing a trivalent titanium compound is subjected to solid-liquid separation. The resulting solid is washed several times with an inert hydrocarbon solvent such as hexane, heptane or the like and then is used for polymerization of α-olefins.

It is preferable from the standpoint of catalyst activity and stereoregularity that the solid obtained from the step of solid-liquid separation be washed with an excessive amount of a halogenated hydrocarbon solvent (e.g. monochlorobenzene) at least one time at a temperature of 50° to 120° C., followed by several times of washing with an aliphatic hydrocarbon solvent (e.g. hexane) and then be used for α-olefin polymerization.

(g) Organo aluminum compound (B)

The organo aluminum compound (B) used in combination with the solid catalyst component (A) in the present invention has at least one Al—C bond in the molecule. The organo aluminum compound are typically represented by the following general formulas.

$R^{12}_\gamma AlY_{3-\gamma}$ or

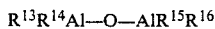

$R^{13}R^{14}Al—O—AlR^{15}R^{16}$ (wherein $R^{12}$, $R^{13}$, $R^{14}$, $R^{15}$ and $R^{16}$ are each a hydrocarbon group having 1 to 8 carbon atoms; Y is a halogen atom, a hydrogen atom or an alkoxy group; and $\gamma$ is a number satisfying $2 \leq \gamma \leq 3$).

Specific examples of the organo aluminum compound include trialkylaluminums such as triethylaluminum, triisobutylaluminum, trihexylaluminum and the like; dialkylaluminum hydrides such as diethylaluminum hydride, diisobutylaluminum hydride and the like; mixtures between a trialkylaluminum and a dialkylaluminum halide; and alkyl alumoxanes such as tetraethyl dialumoxane, tetrabutyl dialumoxane and the like.

Preferable of these organo aluminum compounds are trialkylaluminums, mixtures of a trialkylaluminum and a dialkylaluminum halide, and alkyl alumoxanes. Particularly preferable are triethylaluminum, triisobutylaluminum, a mixture of triethylaluminum and diethylaluminum chloride, and tetraethyl dialumoxane.

The amount of the organo aluminum compound used can be selected as widely as 1 to 1,000 moles per 1 mole of titanium atom in solid catalyst. The amount preferably is 5 to 600 moles.

(h) Silicon compound having Si—OR² bonds (C)

The silicon compound having Si—OR² bonds (wherein $R^2$ is a hydrocarbon group having 1 to 20 carbon atoms) used as the catalyst component (C) of the present invention is preferably an alkoxysilane compound represented by the general formula $R^{17}_\alpha Si(OR^2)_{4-\alpha}$ (wherein $R^2$ and $R^{17}$ are each a hydrocarbon group having 1 to 20 carbon atoms and $\alpha$ is a number satisfying $0 \leq \alpha \leq 3$).

Specific examples of the silicon compound include tetramethoxysilane, methyltrimethoxysilane, dimethyldimethoxysilane, ethyltrimethoxysilane, phenyltrimethoxysilane, phenylmethyldimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane and diethyldiethoxysilane.

Preferable of these are alkoxysilane compounds wherein $R^2$ is a straight chain alkyl group having 1 to 10 carbon atoms and at least one or $R^{17}$ is an aryl group.

The amount of the silicon compound having Si—OR² bonds to be used is 0.01 to 5 moles, preferably 0.03 to 3 moles, particularly preferably 0.05 to 1.0 mole in terms of silicon atom per 1 mole of aluminum atom in organo aluminum compound [catalyst component (B)].

(i) Oragnic carboxylic acid ester (C)

The organic carboxylic acid ester used as the catalyst component (C) of the present invention is mono- and polycarboxylic acid esters, and there can be used aliphatic carboxylic acid esters, olefinic carboxylic acid esters, alicyclic carboxylic acid esters and aromatic carboxylic acid esters. Of these, aromatic carboxylic acid esters are preferable specific examples of preferable organic carboxylic acid esters include methyl benzoate, ethyl benzoate, n-propyl benzoate, isopropyl benzoate, n-butyl benzoate, phenyl benzoate, methyl toluate, ethyl toluate, methyl anisate, ethyl anisate, monoethyl phthalate, dimethylphthalate, methyl ethyl phthalate, diethyl phthalate, di-n-propyl phthalate, diisopropyl phthalate, di-n-butyl phthalate, diisobutyl phthalate, di-n-heptyl phthalate, di-n-octyl phthalate and diphenyl phthalate.

The amount of the organic carboxylic acid ester used is 0.03 to 3 moles, preferably 0.05 to 1.0 mole, particularly preferably 0.1 to 0.5 mole per 1 mole of aluminum atom in organo aluminum compound [catalyst component (B)].

(j) Polymerization of α-olefin

Feeding of each catalyst component into a polymerization reactor can be conducted with no particular restriction except that the feeding is conducted in an inert gas such as nitrogen, argon or the like which is substantially free from moisture.

The catalyst components (A), (B) and (C) can be fed separately, or, two of them can be contacted in advance before feeding.

The polymerization can be carried out at temperatures between −30° C. and 200° C. However, the polymerization at temperatures lower than 0° C. causes the decrease of polymerization speed, and the polymerization at temperatures higher than 100° C. makes it impossible to obtain a polymer of high stereo-regularity. Therefore polymerization temperatures between 0° C. and 100° C. are preferred. The polymerization pressure has no particular restriction but desirably is about 3 to 100 atm from industrial and economical standpoints. The polymerization time is usually 30 minutes to 15 hours and preferably, 1 to 10 hours. The polymerization can use a continuous method or a bath method. Also, the polymerization can use a slurry polymerization method employing an inert hydrocarbon solvent such as propane, butane, pentane, hexane, heptane, octaine or the like or a liquid phase or gas phase polymerication method employing no solvent.

The α-olefins usable in the present invention are those having 3 or more carbon atoms. Specifically there can be mentioned propylene, butene-1, pentene-1, hexene-1, 3-methylpentene-1, 4-methylpentene-1, etc. Needless to say, other α-olefins can be used in the present invention. The polymerization according to the present invention can be homopolymerization or copolymerization (including copolymerization with ethylene). In copolymerization, a mixture of two or more differnet olefins is contacted with the present catalyst system, whereby a copolymer is produced.

Heteroblock copolymerization wherein polymerization is conducted in two or more stages can also be conducted easily with the present catalyst system.

It is also possible to add a chain transfer agent such as hydrogen in order to control the molecular weight of the polymer obtained.

The present invention will be explained in more detail below by way of Examples and Comparative Examples, but the invention should not be limited by the Examples.

In the Examples, the valency of titanium compound was measured by means of polarography with the following condition:

Apparatus:
POLAROGRAPHIC ANALYZER P-1100 (manufactured by Yanagimoto Seisakusho).

Sample:
The sample was prepared by dissolving abaout 70 mg of a catalyst into about 30 ml of a basic solution comprising a tartaric acid aqueous solution having a concentration of 1.5 mole/liter and 1N surfuric acid Method:
Direct current method.

EXAMPLE 1

(1) Synthesis of organo magnesium compound

A flask having an internal volume of 1 liter, equipped with a stirrer, a reflux condenser, a dropping funnel and a thermometer was purged with argon. 32.0 g of chipped magnesium for Grignard reagent was placed therein. 120 g of n-butyl chloride and 500 ml of di-n-butyl ether were placed in the dropping funnel and about 30 ml of resulting mixture was dropped into the flask to start a reaction with magnesium. This dropping was continued at 50° C. for 4 hours from the start of the reaction. After the termination of the dropping, the reaction was continued for further 1 hour at 60° C. Then, the reaction mixture was cooled down to room temperature and the solid portion was removed by filtration.

n-Butylmagnesium chloride present in di-n-butyl ether was hydrolyzed with 1N sulfuric acid and back-titrated with a 1 N aqueous soldium hydroxide solution using phenolphthalein as an indicator to determine the concentration of n-butylmagnesium chloride. The concentration was 2.2 moles per liter.

(2) Synthesis of solid product

A flask having an internal volume of 500 ml, equipped with a stirrer and a dropping funnel was purged with argon. Therein were placed 300 ml of n-heptane, 4.1 g (12.1 mM) of tetrabutoxytitanium and 42.9 g (206 mM) of tetraethoxysilane, and they were made into a uniform solution. Then, 100 ml of the organo magnesium compound prepared in the above (1), placed in the dropping funnel of the flask was slowly dropped into the flask in 2 hours while keeping the temperature inside the flask at 5° C. After the termination of the dropping, stirring was continued for further 1 hour at room temperature, after which solid-liquid separation was conducted at room temperature. The solid was washed three times with 300 ml of n-heptane and then dried under vacuum to obtain 32.0 g of a brown solid product. The valency of titanium atom contained in the solid product measured by polarography was 3.

The solid product contained 1.7% by weight of titanium atom, 18.2% by weight of magnesium atom, 2.2% by weight of silicon atom, 0.8% by weight of n-butyl ether, 33.5% by weight of ethoxy group and 2.4% by weight of butoxy group.

The wide angle X-ray diffraction pattern by Cu—$K_\alpha$ ray for the solid product had no distinct diffraction peak, which indicated that the solid product had an amorphous structure.

(3) Synthesis of ester-treated solid

A flask having an internal volume of 200 ml was purged with argon. Therein were placed 15 g of the solid product prepared in the above (2), 90 ml of monochlorobenzene and 2.7 ml of diisobutyl phthlate, and they were subjected to reaction for 1 hour at 80° C.

After the reaction, solid-liquid separation was conducted. The solid was washed with 120 ml of n-heptane three times. The resulting ester-treated solid contained 6.2% by weight of phthalic acid ester.

(4-1) Synthesis of solid catalyst component - (1)

After the completion of the washing in the above (3), 90 ml of monochlorobenzene, 5.5 ml (32.5 mM) of n-butyl ether and 49.3 ml (450 mM) of titanium tetrachloride were placed in the flask. A reaction was conducted for 1 hour at 80° C. After the completion of the reaction, solid-liquid separation was conducted at 80° C. The solid was washed with 90 ml of monochlorobenzene two times at 80° C. and further with 120 ml of n-heptane four times at room temperature.

The above treatment with the mixture of n-butyl ether and titanium tetrachloride was repeated once more under the same conditions to obtain 13.3 g of an ocher solid catalyst component. The valency of titanium atom contained in the solid catalyst component measured by polarography was 3.

This solid catalyst component contained 1.9% by weight of titanium atom, 21.2% by weight of magnesium atom, 0.2% by weight of silicon atom, 0.1% by weight of butoxy group, 1.2% by weight of ethoxy group, 6.2% by weight of phthalic acid ester, 0.3% by weight of n-butyl ether and 67.0% by weight of chlorine.

(4-2) Synthesis of solid catalyst component - (2)

After the completion of the washing in the above (3), 90 ml of monochlorobenzene, 6.6 ml (32.6 mM) of diisoamyl ether and 49.3 ml (450 mM) of titanium tetrachloride were placed in the flask. A reaction was conducted for 1 hour at 80° C. After the completion of the reaction, solid-liquid separation was conducted at 80° C. The solid was washed with 90 ml of monochlorobenzene two times at 80° C. and further with 120 ml of n-heptane four times at room temperature.

The above treatment with the mixture of n-butyl ether and titanium tetrachloride was repeated once more under the same conditions to obtain 13.0 g of an ocher solid catalyst component. The valency of titanium atom contained in the solid catalyst component measured by polarography was 3.

This solid catalyst component contained 1.8 % by weight of titanium atom, 21.1% by weight of magnesium atom, 0.2% by weight of silicon atom, 0.4% by weight of butoxy group, 1.1% by weight of ethoxy group, 6.2% by weight of phthalic acid ester, 0.2% by weight of diisoamyl ether and 66.7% by weight of chlorine.

(5-1) Polymerization of propylene - (1)

A stainless steel autoclave having an internal volume of 130 ml, of magnetic stirring type was purged with argon. Therein were placed 0.57 mM of triethylaluminum, 0.057 mM of phenyltriethoxysilane, 5.4 mg of the solid catalyst component prepared in the above (4-1), and 80 ml of liquefied propylene.

The autoclave was kept at 60° C. for 1 hour with stirring. Then, surplus propylene was released and the polypropylene formed was air-dried for 24 hours. 21.2 g of a polypropylene was obtained.

Therefore, the yield (g) of polypropylene per 1 g of solid catalyst component (hereinafter this yield is abbreviated to PP/cat) was 3,930.

The percentage of insolubles when the polypropylene powder obtained was subjected to 6 hours extraction with boiling n-heptane [hereinafter this percentage of insolubles is abbreviated to IY (%)] was 97.9%.

(5-2) Polymerization of propylene - (2)

A stainless steel autoclave having an internal volume of 130 ml, of magnetic stirring type was purged with argon. Therein were placed 0.57 mM of triethylaluminum, 0.057 mM of diisobutyl phthalate, 6.2 mg of the solid catalyst component prepared in the above (4-2), and 80 ml of liquefied propylene.

The autoclave was kept at 60° C. for 1 hour with stirring. Then, surplus propylene was released and the polypropylene formed was air-dried for 24 hours. 14.7 g of a polypropylene was obtained.

Therefore, the yield (g) of polypropylene per 1 g of solid catalyst component was 2,370.

The percentage of insolubles when the polypropylene powder obtained was subjected to 6 hours extraction with boiling n-heptane was 95.1%.

COMPARATIVE EXAMPLE 1

A solid catalyst component was synthesized in the same manner as in the steps (1) to (4-1) of Example 1 except that no n-butyl ether was used in the step (4-1) of Example 1. This solid catalyst component contained 4.2% by weight of titanium atom.

Using the solid catalyst component, polymerization of propylene was conducted in the same manner as in the step (5-1) of Example 1. The polypropylene obtained gave a PP/cat of 580 and an IY of 87.1%. Thus, when the treatment after the treatment with the ester compound is conducted only with titanium tetrachloride, the catalyst activity of the solid catalyst component obtained and the stereoregularity of the polypropylene formed are both very low as compared with Example 1.

COMPARATIVE EXAMPLE 2

A solid catalyst component was synthesized in the same manner as in Example 1 except that no treatment with diisobutyl phthalate was conducted. This solid catalyst component contained 3.9% by weight of titanium atom. Using the solid catalyst component, polymerization of propylene was conducted in the same manner as in the step (5-1) of Example 1. The polypropylene obtained gave a PP/cat of 3,370 and an IY of 80.3%.

Thus, when no treatment with diisobutyl phthalate is conducted, the stereoregularity of the polypropylene formed is very low as compared with Example 1.

COMPARATIVE EXAMPLE 3

(1) Synthesis of solid product (carrier)

34 g of a white solid product (carrier) was synthesized in the same manner as in the steps (1) to (2) of Example 1 except that no tetrabutoxytitanium was added and the addition amount of tetraethoxysilane was converted to 49.3 g in the step (2) of Example 1.

The solid product contained 19.1% by weight of magnesium atom, 2.8% by weight of silicon atom and 35.6% by weight of ethoxy group.

(2) Synthesis of solid catalyst component 15.8 g of the solid product prepared in the above (1), 80 ml of monochlorobenzene and 2.4 ml of diisobutyl phthalate were placed in an flask having an interval volume of 200 ml. A reaction was conducted at 80° C. for 1 hour. After the completion of the reaction, solid-liquid separation was conducted. The solid was washed with 100 ml of n-heptane three times.

To the washed solid were added 80 ml of monochlorobenzene and 50 ml of titanium tetrachloride, and the mixture was subjected to reaction for 1 hour at 80° C. After the completion of the reaction, solid-liquid separation was conducted at 80° C. The solid was washed with 80 ml of monochlorobenzene two times at 80° C. Then, the reaction with titanium tetrachloride was repeated once more under the same conditions as above. The solid was washed with monochlorobenzene at 80° C. and further with 100 ml of n-heptane four times. 15.7 g of a greenish white solid catalyst component was obtained. The valency of titanium atom contained in the solid catalyst component measured by polarography was 4.

The solid catalyst component contained 4.0% by weight of tetravalent titanium atom, 21.7% by weight of magnesium atom, 0.1% by weight of silicon atom, 4.1% by weight of ethoxy group and 9.7% by weight of phthalic acid ester.

(3) Polymerization of propylene

Using the solid catalyst component prepared in the above (2), polymerization of propylene was conducted in the same manner as in the step (5-1) of Example 1.

The polypropylene obtained gave a PP/cat of 1,630 and an IY of 91.6%.

Thus, the catalyst activity and the stereoregularity are both low as compared with Example 1.

EXAMPLES 2 TO 5

Solid catalyst components were synthesized in the same manner as in the steps (1) to (4-1) of Example 1 except that in the step (3) of Example 1, diisobutyl phthalate was replaced by the ester compounds shown in Table 1 in a proportion of 1.9 moles per 1 mole of trivalent titanium atom contained in solid product. Using these solid catalyst components, polymerization of propylene was conducted in the same manner as in the step (5-1) of Example 1. The results are shown in Table 1.

TABLE 1

|  | Ester compound | PP/cat (g/g) | IY (%) |
| --- | --- | --- | --- |
| Example 1 | Diisobutyl phthalate | 3,930 | 97.9 |
| Example 2 | Dimethyl phthalate | 3,350 | 95.3 |
| Example 3 | Methyl methacrylate | 1,540 | 93.8 |
| Example 4 | Di-n-butyl maleate | 1,480 | 91.1 |
| Example 5 | Monoethyl phthalate | 1,340 | 91.1 |
| Comparative Example 2 | Not used | 3,370 | 80.3 |

EXAMPLE 6

A solid catalyst component was synthesized in the same manner as in the steps (1) to (4-1) of Example 1 except that n-butyl ether was replaced by 6.6 ml of diisoamyl ether in the step (4-1) of Example 1. Using this solid catalyst component, polymerization of propylene was conducted in the same manner as in the step (5-1) of Example 1.

The polypropylene obtained gave a PP/cat of 3,960 and an IY of 97.9%.

EXAMPLE 7

A flask having an internal volume of 200 ml was purged with argon. Therein were placed 11.8 g of the solid product prepared in the step (2) of Example 1, 60 ml of monochlorobenzene, 1.8 ml of diisobutyl phthalate, 3.8 ml of n-butyl ether and 35.0 ml of titanium tetrachloride. They were subjected to reaction for 1 hour at 80° C.

After the completion of the reaction, solid-liquid separation was conducted at 80° C. The solid was washed with 60 ml of monochlorobenzene twice at 80° C.

To the flask were added 60 ml of monochlorobenzene, 3.8 ml of n-butyl ether and 35.0 ml of titanium tetrachloride, and they were subjected to reaction for 1 hour at 80° C. After the completion of the reaction, solid-liquid separation was conducted at 80° C. The solid was washed with 60 ml of monochlorobenzene twice at 80° C. and further with 60 ml of n-heptane four times at room temperature. The solid was then dried under vacuum to obtain 11.0 g of an ocher solid catalyst component. This solid catalyst component contained 2.3% by weight of titanium atom. The valency of titanium atom measured by polarography was 3.

Using the solid catalyst component, polymerization of propylene was conducted in the same manner as in the step (5-1) of Example 1.

The polypropylene produced gave a PP/cat of 2,250 and an IY of 96.6%.

EXAMPLE 8

(1) Synthesis of solid product

A flask having an internal volume of 500 ml, equipped with a stirrer and a dropping funnel was purged with argon. Therein were placed 300 ml of n-heptane, 11.1 g of tetrabutoxytetanium and 38.9 g of tetraethoxysilane, and they were made into a uniform solution. 100 ml of the organo magnesium compound prepared in the step (1) of Example 1, placed in the dropping funnel of the flask, was slowly dropped into the flask in 2 hours with keeping the temperature inside the flask at 5° C. After the completion of the dropping, stirring was continued for further 1 hour at room temperature, after which solid-liquid separation was conducted at room temperature. The solid was washed with 300 ml of n-heptane three times and dried under vacuum to obtain 42.2 g of a solid product.

This solid product contained 4.3% by weight of trivalent titanium atom, 16.0% by weight of magnesium atom, 2.3% by weight of silicon atom, 32.0% by weight of ethoxy group and 9.1% by weight of butoxy group.

The wide angle X-ray diffraction pattern by Cu—$K_\alpha$ ray for the solid product had no distinct peak, which indicated that the solid product had a amorphous structure.

(2) Synthesis of ester-treated solid

A flask having an internal volume of 200 ml was purged with argon. Therein were placed 14.9 g of the solid product prepared in the above (1), 90 ml of monochlorobenzene and 2.7 ml of diisobutyl phthalate, and they were subjected to reaction for 1 hour at 80° C.

After the completion of the reaction, solid-liquid separation was conducted. The solid was washed with 120 ml of n-heptane three times.

(3) Synthesis of solid catalyst component

After the completion of the washing in the above (2), 90 ml of monochlorobenzene, 6.6 ml of n-butyl ether and 51.2 ml of titanium tetrachloride were added to the washed solid in the flask. They were subjected to reaction for 1 hour at 80° C. After the completion of the reaction, solid-liquid separation was conducted at 80° C. The solid was washed with 90 ml of monochlorobenzene twice at 80° C. and further with 120 ml of n-heptane four times at room temperature.

The above treatment with the mixture of n-butyl ether and titanium tetrachloride was repeated once more under the same conditions to obtain 9.5 g of a solid catalyst component. The solid catalyst component contained 3.6% by weight of titanium atom, 19.7% by weight of magnesium atom, 0.2% by weight of silicon atom, 0.3% by weight of butoxy group, 1.8% by weight ethoxy group and 6.7% by weight of phthalic acid ester. The valency of titanium atom contained in the solid catalyst component measured by polarography was 3.

(4) Polymerization of propylene

Using the solid catalyst component prepared in the above (3), polymerization of propylene was conducted in the same manner as in the step (5-1) of Example 1.

The polypropylene produced gave a PP/cat of 3,250 and an IY of 95.0%.

EXAMPLES 9 TO 11

Solid catalyst components were synthesized in the same manenr as in the steps (1) to (4-1) of Example 1 except that tetrabutoxytitanium was replaced by 12.1 mM of each titanium compound shown in Table 2, in the step (2) of Example 1. Using these solid catalyst components, polymerization of propylene was conducted in the same manner as in the step (5-1) of Example 1. The results are shown in Table 2.

TABLE 2

| | Titanium compound | PP/cat (g/g) | IY (%) |
|---|---|---|---|
| Example 9 | Ti(O—i-C$_3$H$_7$)$_4$ | 3,040 | 94.1 |
| Example 10 | 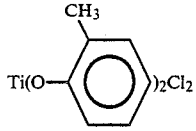 | 1,140 | 96.2 |
| Example 11 | Ti(O—n-C$_4$H$_9$)$_2$Cl$_2$ | 2,660 | 94.9 |

EXAMPLES 12 TO 14

Solid catalyst components were synthesized in the same manner as in the steps (1) to (4-1) of Example 1 except that the amount of titanium tetrachloride added was varied in the step (4-1) of Example 1. Using these solid catalyst components, polymerization of propylene was conducted in the same manner as in the step (5-1) of Example 1. The results are shown in Table 3.

TABLE 3

| | Amount of TiCl$_4$ added (mM) | Amount of n-butyl ether added (mM) | PP/cat (g/g) | IY (%) |
|---|---|---|---|---|
| Example 12 | 100 | 32.5 | 1,060 | 98.5 |
| Example 13 | 225 | 32.5 | 2,680 | 98.0 |
| Example 14 | 900 | 32.5 | 3,940 | 97.6 |

EXAMPLES 15 TO 20

Using the solid catalyst component prepared in the steps (1) to (4-1) of Example 1, polymerization of propylene was conducted in the same manner as in the step (5-1) of Exmaple 1 except that phenyltriethoxysilane as the catalyst component (C) was replaced by each silane compound shown in Table 4. The results are shown in Table 4.

TABLE 4

| | Silane compound | Silane compound/ALEt$_3$ Molar ratio | PP/cat (g/g) | IY (%) |
|---|---|---|---|---|
| Example 15 | Tetraethoxysilane | 0.1 | 4,520 | 96.1 |
| Example 16 | Ethyltriethoxysilane | 0.1 | 4,420 | 96.0 |
| Example 17 | Vinyltriethoxysilane | 0.3 | 1,270 | 97.0 |
| Example 18 | Methylphenyldimethoxysilane | 0.3 | 4,980 | 98.0 |
| Example 19 | Diphenyldimethoxysilane | 0.15 | 5,890 | 99.1 |
| Example 20 | Phenyltrimethoxysilane | 0.2 | 6,280 | 99.1 |

EXAMPLE 21

Slurry polymerization of of propylene

A stainless steel autocalve having an internal volume of 3 l, of stirring type was purged with argon. Therein were placed 1.0 l of dry n-heptane, 2.6 mM of triethylaluminum, 0.39 mM of phenyltriethoxysilane and 45.7 mg of the solid catalyst component prepared in Example 7. Subsequently hydrogen was added so that hydrogen had a partial pressure of 0.13 kg/cm$^2$. Then, the temperature of the autoclave was increased to 65° C. and propylene was fed thereinto under pressure until the total presure inside the autoclave became 6 kg/cm$^2$, whereby a polymerization was started. The polymerization was continued for 2 hours at 65° C. with supplementing propylene so that the above total pressure was kept. After the completion of the polymerization, introduction of propylene was stopped and the unreacted monomer was released. The resultin mixture was filtered through a Buchner funnel and the polymer collected was dried at 60° C. to obtain 163.9 g of a polypropylene powder. The filtrate was subjected to evaporation by an evaporator to distil off n-heptane, whereby 2.5 g of an amorphous polymer was obtained. The proportion of n-heptane insoluble in total polymer yield [abbreviated as HIP (%)] was 98.5%. The yield (g) of polymer per 1 g of solid catalyst component (PP/cat) was 3,640.

EXAMPLE 22

Polymerization in liquefied propylene

A stainless steel autoclave having an internal volume of 3 l, of stirring type was purged with argon. Therein was placed 2.6 mM of triethylaluminum, 0.39 mM of phenyltriethoxysilane and 16.7 mg of the solid catalyst component prepared in Example 6. Then, hydrogen was fed thereinto so that the partial pressure of hydrogen became 0.12 kg/cm$^2$. Subsequently, 780 g of liquefied propylene was fed into the autoclave. The temperature of the autoclave was increased to 65° C. and a polymerization was conducted for 2 hours at 65° C. After the completion of the polymerization, the unreacted monomer was released. The polymer formed was dried for 2 hours at 60° C. under vacuum to obtain 263 g of a polypropylene powder. Therefore, the PP/cat was 15,750. The proportion of the atactic component soluble in cold xylene, in total polymer yield [abbreviated as CXS (%)] was 3.6% by weight.

The polypropylene powder had a molecular weight [η] of 2.34 when measured in tetralin at 135° C.

EXAMPLE 23

Polymerization of propylene was conducted in the same manner as in Example 22 except that the polymerization time was changed to 4 hours.

The polypropylene produced gave a PP/cat of 26,160, a CXS of 3.4% by weight and an [η] of 2.03 when measured in tetralin at 135° C.

EXAMPLE 24

Polymerization of propylene was conducted in the same manner as in Example 22 except that phenyltriethoxysilane was replaced by 0.39 mM of phenyltrimethoxysilane.

The polypropylene produced gave a PP/cat of 17,500 and a CXS of 2.5% by weight.

EXAMPLE 25

Ethylene/propylene random copolymerization

A stainless steel autoclave having an internal volume of 5 l, of stirring type was purged with argon. 1.5 l of dry n-heptane was placed therein. Then, hydrogen and ethylene were fed into the autoclave so that the partial pressures of hydrogen and ethylene became 0.07 kg/cm$^2$ and 0.16 kg/cm$^2$, respectively. The temperature of the autoclave was increased to 50° C. Propylene was fed into the autoclave until the total pressure became 4 kg/cm$^2$. Subsequently, 3.9 mM of triethylaluminum, 0.59 mM of phenyltriethoxysilane and 48.6 mg of the solid catalyst component prepared in Example 1 were added. A polymerization was conducted for 2 hours while keeping the total pressure at 4 kg/cm$^2$ by supplying an ethylene/propylene mixed gas containing 12% by volume of ethylene. After the completion of the polymerization, supply of the mixed gas was stopped and the unreacted monomers were released. The reaction mixture was filtered through a Buchner filter and the copolymer collected was dried at 60° C. to obtain 302.4 g of an ethylene/propylene copolymer powder. The filtrate was subjected distillation in an evaporator to remove n-heptane, whereby 23.6 g of an amorphous polymer was obtained. Therefore, the HIP of the total polymer formed was 92.9%. The copolymer yield per 1 g of solid catalyst component, PP/cat, was 6,220. The measurement of infrared absorption spectrum revealed that the copolymer contained 4.9% by weight of ethylene. The copolymer had a molecular weight $[\eta]$ of 2.4 when measured in tetralin at 135° C.

EXAMPLE 26

A solid catalyst component was synthesized in the same manner as in Example 1 except that a reduction temperature in the synthesis of a solid product in (B) was changed from 5° to −20° C. The resulting solid catalyst component contained 2.1% by weight of titanium atom, the valency of which measured by polarography was 3.

Using the solid catalyst component, polymerization of propylene was conducted in the same condition as in (E) of Example 1. As a result, the polypropylene produced gave a PP/cat of 3,540 and an IY of 97.6%.

EXAMPLE 27

A solid catalyst component was synthesized in the same manner as in Example 1 except that the reduction temperature in the synthesis of a solid product in (B) was changed from 5° to 20° C. The resulting solid catalyst component contained 2.4% by weight of titanium atom and the valency of the titanium atom measured by polarography was 3.

Using the solid catalyst component, polymerization of propylene was conducted in the same condition as in (E) of Example 1. As a results, the polypropylene produced gave a PP/cat of 3,090, and an IY of 98.1%.

COMPARATIVE EXAMPLE 4

A solid catalyst component was synthesized in the same manner as in the steps (1) to (4-2) of Example 1 except that diisoamyl ether was not used in the step (4-2). This solid catalyst component contained 3.9% by weight of titanium atom.

Using the solid catalyst component, polymerization of propylene was conducted in the same manner as in the step (5-2) of Example 1. The polypropylene formed gave a PP/cat of 460 and an IY of 88.4%. When the ester-treated solid is treated only with titanium tetrachloride, the catalyst activity of the resulting solid catalyst component and the stereoregularity of the polymer formed are very low as compared with Example 1.

COMPARATIVE EXAMPLE 5

A solid catalyst component was synthesized in the same manner as in the steps (1) to (4-2) of Example 1 except that the step (3) (treatment with diisobutyl phthalate) was not conducted. The solid catalyst component contained 4.1% by weight of titanium atom. Using this solid catalyst component, polymerization of propylene was conducted in the same manner as in the step (5-2) of Example 1. The polypropylene formed gave a PP/cat of 1,270 and an IY of 86.5%.

When the treatment with diisobutyl phthalate is not conducted, the resulting solid catalyst component gives a polypropylene very low in stereoregularity as compared with Example 1.

COMPARATIVE EXAMPLE 6

(1) Synthesis of solid product (carrier)

34 g of a white solid product (carrier) was synthesized n the same manner as in the steps (1) and (2) of Example 1 except that no tetrabutoxyitanium was added and the addition amount of tetraethoxysilane was changed to 49.3 g in the step (2).

The solid product contained 19.1% by weight of magnesium atom, 2.8% by weight of silicon atom and 35.6% by weight of ethoxy group.

(2) Synthesis of solid catalyst component

In a flask having an internal volume of 200 ml, purged with argon were placed 15.8 g of the solid product prepared in the above (1), 80 ml of monochlorobenzene and 2.4 ml of diisobutyl phthalate. They were subjected to reaction for 1 hour at 80° C. After the completion of the reaction, solid-liquid separation was conducted. The solid was washed with 100 ml of n-heptane three times.

To the solid were added 80 ml of monochlorobenzene and 50 ml of titanium tetrachloride, and they were subjected to reaction for 1 hour at 80° C. After the completion of the reaction, solid-liquid separation was conducted at 80° C. The solid was washed with 80 ml of monochlorobenzeen two times at 80° C. The washed solid was subjected to the reaction with titanium tetrachloride once more under the same conditions as above. The resulting solid was washed with monochlorobenzene at 80° C. and further with 100 ml of n-heptane four times to obtain 15.7 g of a greenish white solid catalyst component. The valency of titanium atom contained in the solid catalyst component measured by polarography was 4.

This solid catalyst component contained 4.0% by weight of tetravalent titanium atom, 21.7% by weight of magnesium atom, 0.1% by weight of silicon atom, 4.1% by weight of ethoxy group and 9.7% by weight of phthalic acid ester.

(3) Polymerization of propylene

Using the solid catalyst component prepared in the above (2), polymerization of propylene was conducted in the same manner as in the step (5-2) of Example 1.

The polypropylene formed gave a PP/cat of 1,070 and an IY of 91.2%.

The catalyst activity and the stereoregularity are both low as compared with Example 1.

EXAMPLE 28

(1) Synthesis of solid catalyst component

An ocher solid catalyst component was synthesized in the same manner as in the steps (1) to (4-2) of Example 1 except that diisoamyl ether was replaced by 5.5 ml of n-butyl ether in the step (4-2). This solid catalyst component contained 1.9% by weight of titanium atom.

(2) Polymerization of propylene

Using the solid catalyst component prepared in the above (1), polymerization of propylene was conducted in the same manner as in the step (5-2) of Example 1 except that diisobutyl phthalate was replaced by 0.225 mM of ethyl p-anisate.

The polypropylene formed gave a PP/cat of 1,870 and an IY of 96.0%.

EXAMPLE 29

A solid catalyst component was synthesized in the same manner as in the steps of (1) to (4-2) of Example 1 except that diisobutyl phthalate was replaced by 1.5 ml of ethyl benzoate in the step (3) and diisoamyl either was replaced by 5.5 ml of n-butyl ether in the step (4-2).

Using this solid catalyst component, polymerization of propylene was conducted under the same conditions as in the step (2) of Example 28.

The polypropylene formed gave a PP/cat of 1,030 and an IY of 96.6%.

EXAMPLE 30

A solid catalyst component was synthesized in the same manner as in the steps (1) to (4-2) of Example 1 except that diisobutyl phthalate was replaced by 1.1 ml of methyl methacrylate in the step (3) and dissoamyl ether was replaced by 5.5 ml of n-butyl ether in the step (4-2).

Using this solid catalyst component, polymerization of propylene was conducted under the same conditions as in the step (2) of Example 28.

The polypropylene formed gave a PP/cat of 1,450 and an IY of 95.0%.

EXAMPLE 31

Using the solid catalyst component prepared in Example 26, polymerization of propylene was conducted in the same manner as in the step (5-2) of Example 1 except that diisobutyl phthalate was replaced by 0.225 mM of methyl p-toluate.

The polypropylene formed gave a PP/cat of 1,640 and an IY of 96.0%.

EXAMPLE 32

(1) Synthesis of solid product

A flask having an internal volume of 500 ml, equipped with a stirrer and a dropping funnel was purged with argon. Therein were placed 300 lm of n-heptane, 11.1 g of tetrabutoxytitanium and 38.9 g of tetraethoxysilane, and they were made into a uniform solution. 100 ml of the organo magnesium compound prepared in the step (1) of Example 1, placed in the dropping funnel of the flask, was slowly dropped into the flask in 2 hours while keeping the temperature inside the flask at 5° C. After the completion of the dropping, stirring was continued for further 1 hour at room temperature. Thereafter, solid-liquid separation was conducted at room temperature. The solid was washed with 300 ml of n-heptane three times and then dried under vacuum to obtain 42.2 g of a solid product.

This solid product contained 4.3% by weight of trivalent titanium atom, 16.0% by weight of magnesium atom, 2.3% by weight of silicon atom, 32.0% by weight of ethoxy group and 0.1% by weight of butoxy group.

The wide angle X-ray diffraction pattern by Cu—$K_\alpha$ for the solid product had no distinct diffraction peak, which indicated that the solid product had an amorphous structure.

(2) Synthesis of ester-treated solid

A flask having an internal volume of 200 ml was purged with argon. Therein were placed 14.9 g of the solid product prepared in the above (1), 90 ml of monochlorobenzene and 2.7 ml of diisobutyl phthalate. They were subjected to reaction for 1 hour at 80° C.

After the completion of the reaction, solid-liquid separation was conducted. The solid was washed with 120 ml of n-heptane three times.

(3) Synthesis of solid catalyst component

In the flask containing the washed solid were placed 90 ml of monochlorobenzene, 6.6 ml of n-butyl ether and 51.2 ml of titanium tetrachloride, and they were subjected to reaction for 1 hour at 80° C. After the completion of the reaction, solid-liquid separation was conducted at 80° C. The solid was washed with 90 ml of monochlorobenzene two times at 80° C. and further with 120 ml of n-heptane four times at room temperature.

The treatment with the mixture of n-butyl ether and titanium tetrachloride was repeated once more under the same conditions as above, whereby 9.5 g of a solid catalyst component was obtained. The solid catalyst component contained 3.6% by weight of titanium atom, 19.7% by weight of magnesium atom, 0.2% by weight of silicon atom, 0.3% by weight of butoxy group, 1.8% by weight of ethoxy group and 6.7% by weight of phthalic acid ester. The valency of titanium atom contained in the solid catalyst component measured by polarography was 3.

(4) Polymerization of propylene

Using the solid catalyst component prepared in the above (3), polymerization of propylene was conducted in the same manner as in the step (5-2) of Example 1.

The polypropylene formed gave a PP/cat of 1,960 and an IY of 93.9%.

EXAMPLES 33 to 35

Solid catalyst components were synthesized in the same manner as in the steps (1) to (4-2) of Example 1 except that tetrabutoxytitanium was relaced by 12.1 mM of each titanium compound shown in Table 5, in the step (2) and diisoamyl ether was replaced by 5.5 ml of n-butyl ether in the step (4-2).

Using these solid catalyst components, polymerization of propylene was conducted in the same manner as in the step (5-2) of Example 1. The results are shown in Table 5.

TABLE 5

| | Titanium compound | PP/cat (g/g) | IY (%) |
|---|---|---|---|
| Example 33 | Ti(O—iso-$C_3H_7$)$_4$ | 1,820 | 92.0 |
| Example 34 | 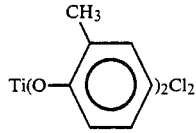 | 850 | 94.7 |
| Example 35 | Ti(O—n-$C_4H_9$)$_2Cl_2$ | 1,510 | 93.5 |

As appreciated from the above explanation, the following advantageous effects can be obtained by using the catalyst system of the present invention.

1. Since the catalyst system is high in catalyst activity per solid catalyst component and also per titanium atom, the polymer produced therewith is very low in halogen atom content and titanium atom content which greatly affect the coloring stability and corrosiveness of the polymer, without employing any particular procedure for catalyst residue removal. Hence, no facility is required for catalyst residue removal and the production cost of α-olefin polymers can be reduced.

What is claimed is:

1. A process for producing alpha-olefin polymers which comprises homopolymerizing or copolymerizing alpha-olefins in the presence of a catalyst system comprising:
   (A) a solid catalyst component containing a trivalent titanium compound, which is obtained by reducing a titanium compound represented by the general formula $Ti(OR^1)_nX_{4-n}$ (wherein $R^1$ is a hydrocarbon group having 1 to 20 carbon atoms, X is a halogen atom, and n is a number satisfying $0 < n \leq 4$) with an organo magnesium compound in the presence of an organo silicon compound having Si—O bonds of the formula:

$Si(OR^3)_m R^4{}_{4-m'}$, $R^5(R^6SiO)_p SiR^7{}_3$ or $(R^8SiO)_q$ (wherein $R^3$ is a hydrocarbon group having 1 to 20 carbon atoms, $R^4$, $R^5$, $R^6$, $R^7$ and $R^8$ are each a hydrocarbon group having 1 to 20 carbon atoms or a hydrogen atom, mm is a number satisfying $0 < m \leq 4$, p is an integer of 1 to 1,000, and q is an integer of 2 to 1,000);
   and then treating the resulting solid product with a mono- or poly-carboxylic acid ester compound and a mixture of a dialkyl ether compound and titanium tetrachloride;
   (B) an organo aluminum compound; and
   (C) an organo silicon compound having Si—$OR^2$ bonds which is an alkoxysilane compound represented by the general formula $R^{17}{}_\alpha Si(OR^2)_{4-\alpha}$ (wherein $R^2$ and $R^{17}$ are each a hydrocarbon group having 1 to 20 carbon atoms and $\alpha$ is a number satisfying $0 \leq \alpha \leq 3$) and/or an organic carboxylic acid ester, at a temperature of $-30°$ C. to $200°$ C. under a pressure of 3 to 100 atm.

* * * * *